(12) United States Patent
Sykes et al.

(10) Patent No.: US 7,401,596 B2
(45) Date of Patent: Jul. 22, 2008

(54) PIEZO STACK TEMPERATURE ESTIMATOR

(75) Inventors: Martin A. P. Sykes, Rainham (GB);
Joseph R Walsh, Kineton (GB); Daniel J. Hopley, Chislehurst (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/655,665

(22) Filed: Jan. 19, 2007

(65) Prior Publication Data

US 2007/0170814 A1 Jul. 26, 2007

(30) Foreign Application Priority Data

Jan. 20, 2006 (GB) ................. 06250326.3

(51) Int. Cl.
*F02P 3/08* (2006.01)
*F02P 3/06* (2006.01)

(52) U.S. Cl. ................... 123/498; 239/102.2

(58) Field of Classification Search ........... 123/498, 123/494, 478; 310/317, 311; 239/102.2, 239/585.1
See application file for complete search history.

(56) References Cited

U.S. PATENT DOCUMENTS

| | | | | |
|---|---|---|---|---|
| 5,855,192 A * | 1/1999 | McCowan et al. | ..... | 123/179.21 |
| 5,865,153 A * | 2/1999 | Matsumoto | ........ | 123/299 |
| 6,253,736 B1 * | 7/2001 | Crofts et al. | ........ | 123/498 |
| 6,328,019 B1 | 12/2001 | Janker et al. | | |
| 6,499,464 B2 * | 12/2002 | Rueger | ........ | 123/446 |
| 6,619,268 B2 * | 9/2003 | Rueger et al. | ........ | 123/490 |
| 6,705,291 B2 * | 3/2004 | Rueger et al. | ........ | 123/467 |
| 6,766,791 B2 * | 7/2004 | Bock et al. | ........ | 123/498 |
| 2003/0218437 A1 | 11/2003 | Bock et al. | | |
| 2004/0255910 A1 | 12/2004 | Joos et al. | | |
| 2005/0077394 A1 | 4/2005 | Igashira et al. | | |

FOREIGN PATENT DOCUMENTS

JP 05029676 A * 2/1993
WO WO 2005043098 A * 5/2005

* cited by examiner

*Primary Examiner*—Mahmoud Gimie
(74) *Attorney, Agent, or Firm*—David P. Wood (57) ABSTRACT

The invention relates to a method of estimating the temperature of a piezoelectric actuator body for controlling the operation of a fuel injector mounted within an engine housing and supplied with fuel from a high pressure fuel pump. The piezoelectric actuator body is housed within a volume of fuel. The method comprises determining a temperature ($T_{INJ\_IN}$, $T_{PUMP\_IN}$) of fuel upstream of the fuel volume, determining a temperature ($T_{CYL}$) of the engine housing, and estimating a temperature ($T_{STACK\_STEADY\_STATE}$; $T_{STACK\_DYNAMIC}$) of the piezoelectric actuator body based on the upstream temperature ($T_{INJ\_IN}$, $T_{PUMP\_IN}$) and the temperature ($T_{CYL}$) of the engine housing. By considering the heat transfer between the piezoelectric actuator body, the injector and fuel within the volume, and the heat transfer due to fuel flow through the volume for an injection, the temperature of the piezoelectric actuator body can be estimated by modelling or mapping.

32 Claims, 4 Drawing Sheets

PIEZO STACK TEMPERATURE ESTIMATOR

This invention relates to a method for estimating the temperature of a piezoelectric actuator for use in controlling operation of a fuel injector. In particular, the invention relates to a method of estimating the temperature of a piezoelectric actuator which is housed within a fuel volume in an injector for use in the delivery of fuel to a combustion space of an internal combustion engine. The invention further relates to a method that improves the control of a piezoelectrically operated fuel injector independently of temperature.

In known piezoelectrically actuated fuel injectors, a piezoelectric actuator arrangement is operable to control movement, directly or indirectly, of a valve needle of the injector between injecting and non-injecting states. The valve needle is engageable with a seating to control fuel delivery through one or more outlet openings of the injector. The piezoelectric actuator arrangement typically comprises a stack of piezoelectric elements, which have an associated capacitance. Varying a voltage applied across the piezoelectric stack controls the energisation level of the stack and therefore the axial length of the piezoelectric stack. By varying the length of the stack, the position of the valve needle relative to the seating is varied. A known piezoelectrically operated fuel injector of the aforementioned type is described in our co-pending European patent application EP 1174615.

Stack displacement can be controlled by varying the voltage which is applied across the stack. With a first voltage applied across the stack, the stack is at a first energisation level and its length is relatively short. With a second, lower voltage applied across the stack, the stack is at a second energisation level, and the length of the piezoelectric stack is increased (i.e. the stack is displaced). By varying the energisation level of the piezoelectric stack, so as to alter stack displacement, movement of the injector valve needle between injecting and non-injecting states can be controlled. The voltages applied to the stack are selected to provide displacement of the stack through an amount that gives the required extent of movement (displacement) of the injector valve needle between its injecting and non-injecting states.

Ideally, every time the voltage across the stack is changed from the first voltage to the second voltage the stack is displaced by the same amount. Similarly, every time the voltage is changed back from the second voltage to the first voltage the stack is displaced back to its original position. In other words, a constant voltage change (from the first voltage to the second voltage) will ideally result in a constant stack displacement (from a first length to a second length). In practice, however, this is not always the case because piezoelectric material is temperature sensitive and this has an effect on the overall capacitance, and therefore the charge characteristics, of the stack.

It is also possible to control the length of the stack by controlling the transfer of charge to and from the stack, rather than by controlling the voltage directly. However, a similar problem exists in the charge control regime as the relationship between stack displacement and charge transfer is also sensitive to temperature.

It is one object of the present invention to provide a method of estimating the temperature of the piezoelectric stack so as to enable control of the fuel injector in a substantially temperature independent manner.

According to a first aspect of the invention, there is provided a method of estimating the temperature of a piezoelectric actuator body for controlling the operation of a fuel injector mounted within an engine housing and supplied with fuel from a high pressure fuel pump. The piezoelectric actuator body is located within a fuel volume which receives fuel from the high pressure fuel pump, in use. The method comprises determining a first temperature of fuel upstream of the fuel volume, determining a temperature of the engine housing, and estimating a temperature of the piezoelectric actuator body based on the first temperature and the temperature of the engine housing.

The invention provides the advantage that it enables an estimate to be made of the temperature of the piezoelectric body (e.g. the piezoelectric stack), which, in turn, can be used to adjust the charge and/or voltage transfer to or from the piezoelectric body so as to ensure injector valve needle movement is controlled consistently and independently of temperature variation.

It is not currently practical to measure the temperature of the piezoelectric stack in operation (i.e. real time) for several reasons. Firstly, it is not straightforward to connect a temperature sensor to the piezoelectric stack as this requires the use of additional connecting wires, over and above those required for the electrical connections for the voltage supply, due to the limited space available. This is a particular problem in piezoelectric injectors in which the stack is immersed in fluid. Secondly, the provision of a sensor on the piezoelectric stack adds additional cost to the injector arrangement as a whole, which is not desirable. Finally, such temperature sensors are not reliable over the life cycle of the injector and are prone to lead to spurious results.

In one embodiment, the step of determining the first temperature includes determining a temperature of fuel at an inlet of the fuel injector.

The method of this embodiment preferably further includes determining a pump outlet temperature of fuel at an outlet of the high pressure fuel pump and determining the injector inlet temperature based on the pump outlet temperature.

More preferably still, determining the pump outlet temperature includes measuring a pump inlet temperature at an inlet to the high pressure fuel pump, measuring the pressure of fuel at the high pressure fuel pump outlet, and calculating the pump outlet temperature based on the pump inlet temperature, the measured fuel pressure and a pump gain factor.

The injector inlet temperature can be determined as being equal to the pump outlet temperature or, alternatively, can be determined based on the pump outlet temperature and a predetermined time constant representative of at least one system characteristic between the pump outlet and the injector inlet.

The system characteristic typically includes a time lag between the pump outlet temperature and the injector inlet temperature.

One particular embodiment of the invention utilises a mapping function to estimate the steady state temperature of the piezoelectric actuator body. For example, the mapping function may receive inputs of the injector inlet temperature, the temperature of the engine housing, an engine speed condition and a fuel delivery condition. The mapping function compares the engine running data with pre-stored values which, typically, are stored on an engine control unit (ECU) which also controls fuel injector operation.

The mapping function may be configured to compare a value based on the engine housing temperature and the injector inlet temperature with a predetermined calibration value, the method further comprising estimating the steady state temperature of the piezoelectric body on the basis of the comparison.

Conveniently, the value is the ratio of (i) the difference between the estimated steady state temperature of the piezoelectric body and the injector inlet temperature and (ii) the difference between the engine housing temperature and the injector inlet temperature.

The method may, but need not, include the step of determining the predetermined calibration value itself. Alternatively, the calibration steps need not form an essential part of the method and need not, therefore, be implemented as method steps in an engine control unit (ECU) in which the essential method steps are implemented. Calibration is conveniently carried out by an engine/system manufacturer, prior to supply and/or fitment of the fuel injection system to the vehicle.

Preferably, determining the predetermined calibration value includes measuring the injector inlet temperature using an injector inlet temperature sensor; determining the temperature of the engine housing; measuring the steady state temperature of the piezoelectric actuator body using a piezoelectric temperature sensor; and calculating the predetermined calibration value as a ratio of (i) the difference between the measured steady state temperature of the piezoelectric actuator body and the injector inlet temperature and (ii) the difference between the measured engine housing temperature and the injector inlet temperature.

In another embodiment of the invention, a different mapping function is employed. In this case, the step of determining the first temperature includes determining a pump inlet temperature at an inlet to the high pressure fuel pump and determining a pressure of fuel at an outlet of the high pressure fuel pump. The steady state temperature of the piezoelectric actuator body is estimated by means of a mapping function which receives inputs of the pump inlet temperature, the temperature of the engine housing, the pressure of fuel at the high pressure fuel pump outlet, an engine speed condition and a fuel delivery condition.

Once the steady state temperature of the stack has been estimated, it is preferable to estimate the dynamic temperature of the piezoelectric actuator body based on the estimated steady state temperature.

In a further alternative embodiment, the method includes estimating a dynamic temperature of the piezoelectric actuator body directly, rather than first calculating the steady state temperature. Typically, modelling is implemented by means of a thermal model of heat transfer between the piezoelectric actuator body, the injector body and the fuel volume. The thermal model receives inputs based on injector inlet temperature and the temperature of the engine housing.

The thermal model preferably further receives inputs based on an engine speed condition and a fuel delivery condition during running conditions.

The thermal model typically includes a sub-model of heat transfer to and from the piezoelectric actuator body. The thermal model may also include a sub-model of heat transfer to and from the fuel within the fuel volume. Finally, the thermal model may also include a sub-model of heat transfer to and from the fuel injector.

In any of the embodiments of the invention, the method may include controlling the fuel injector in dependence upon the estimated dynamic temperature of the piezoelectric body. In this way, any inaccuracies of control that would otherwise arise due to a temperature dependency of the control strategy (e.g. charge and/or voltage control) can be removed.

If only a steady state temperature is estimated, the injector may be controlled in dependence upon the estimated steady state temperature of the piezoelectric actuator body.

Controlling the fuel injector may, for example, include controlling the voltage and/or charge transfer to and from the piezoelectric actuator body.

The determination of the temperature of the engine housing may include measuring the temperature of the engine housing using a temperature sensor. Alternatively, where an engine coolant is provided for cooling the engine housing, as is often the case, determining the temperature of the engine housing includes estimating the temperature of the engine housing based on the temperature of the engine coolant.

The invention also relates to a computer program product comprising at least one computer program software portion which, when executed in an execution environment, is operable to implement one or more of the steps of the accompanying method claims, and to a data storage medium having the or each computer software portion stored thereon. The invention further relates to a microcomputer provided with such a data storage medium.

The invention will now be described, by way of example only, with reference to the accompanying drawings in which.

Figure 1:
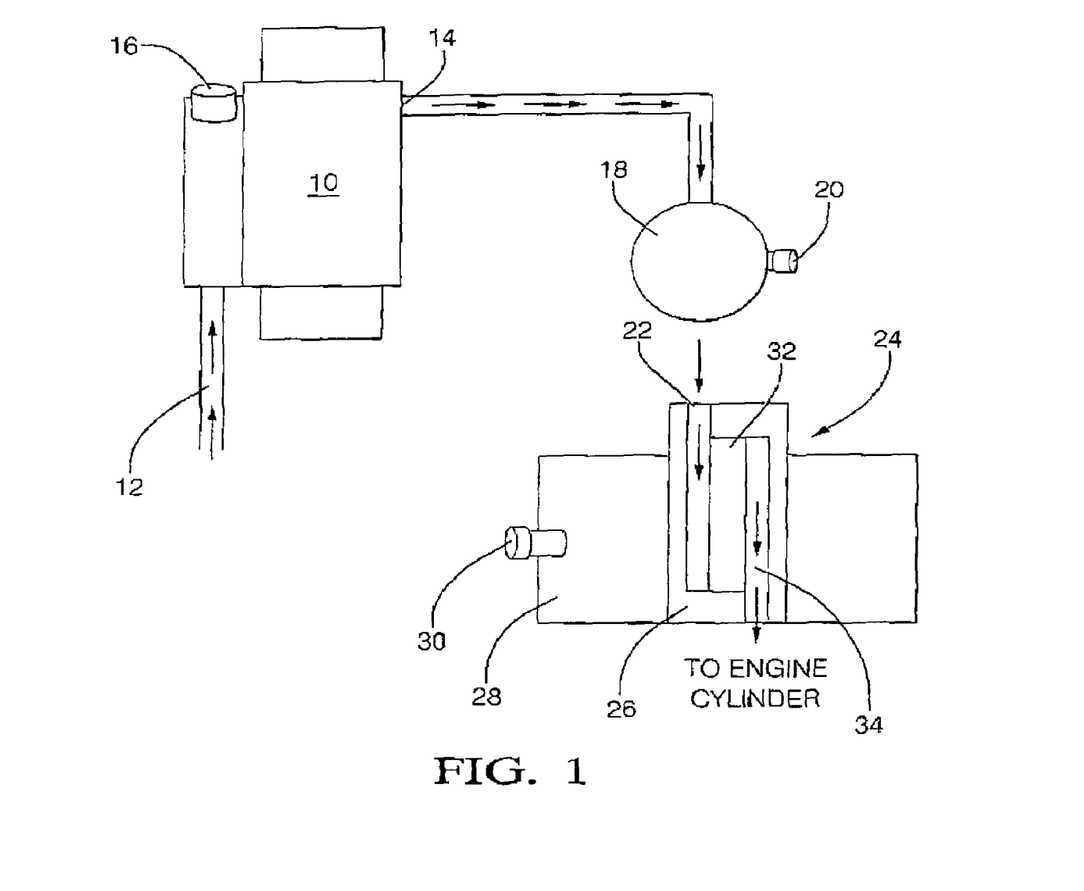
FIG. 1 is a schematic diagram of a fuel injection system including a fuel injector having a piezoelectric stack for controlling injection.

Referring to FIG. 1, a fuel system includes a high pressure fuel pump 10 having a pump inlet 12 for receiving fuel at relatively low pressure (e.g. transfer pressure) and for pressurising fuel to a relatively high pressure for delivery through a pump outlet 14. The pump inlet 12 is provided with a temperature sensor 16 which provides an output signal indicative of the temperature of fuel delivered to the pump inlet 12.

The pump outlet 14 supplies pressurised fuel to a common rail (accumulator fuel volume) 18 which is fitted with a pressure sensor 20 for measuring the pressure of fuel within the rail 18. Fuel within the common rail 18 is supplied to an inlet 22 of a fuel injector, referred to generally as 24, which is arranged to control the delivery of fuel into an associated engine cylinder or other combustion space. The fuel injector 24 includes an injector body 26 which is mounted in an engine housing in the form of an engine cylinder head 28. The engine cylinder head 28 is fitted with a temperature sensor 30 for providing an output signal indicative of the temperature of the cylinder head.

The fuel injector also includes a piezoelectric body 32, in the form of a stack of piezoelectric elements, which is controlled by means of an electronic control unit (ECU) (not shown) to control the position of an injector valve needle (also not shown). The piezoelectric stack 32 is housed within a fuel volume 34 referred to as the stack volume, which is filled with fuel. The stack volume 34 receives fuel from the injector inlet and delivers fuel through an injector outlet (not shown) into the engine cylinder. The stack volume 34 therefore forms a part of the flow path for fuel between the injector inlet 22 and the injector outlet.

The ECU provides signals to control charge transfer to the piezoelectric stack 32 in order to control stack movement.

The ECU also receives signals from the pump inlet temperature sensor 16, the rail pressure sensor 20 and the cylinder head temperature sensor 30.

By varying the charge transfer to and from the piezoelectric stack 32, the length of the piezoelectric stack 32 is varied and, hence, the position of the injector valve needle is controlled. The position of the valve needle relative to a valve needle seating determines whether or not fuel is injected into the engine cylinder. Valve needle position, together with the velocity of the valve needle, determine the amount of fuel delivery.

In another operating regime, the voltage transfer to and from the piezoelectric stack 32 is varied so as to control the length of the piezoelectric stack and, hence, the position of the valve needle relative to the valve needle seating.

In use, the temperature of the piezoelectric stack 32 varies depending on various engine operating conditions. Both charge and voltage transfer to and from the stack are affected by the temperature of the piezoelectric stack and so it is one object of the preferred embodiment of the invention to provide a method of determining the temperature of the stack so as to allow charge and/or voltage transfer to be controlled independently of the stack temperature.

Figure 2:
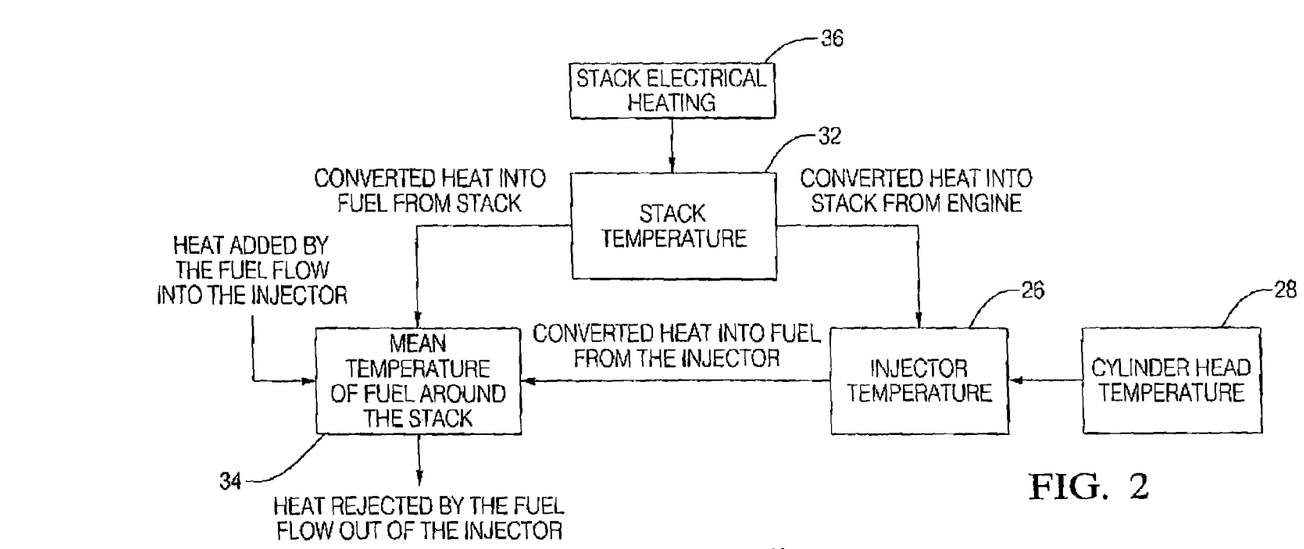
FIG. 2 is block diagram of several elements of the fuel injection system in FIG. 1 to illustrate the heat transfer paths between the elements.

In one embodiment, the steady state temperature of the piezoelectric stack 32 ($T_{\_STACK\ STEADY\ STATE}$) is determined by mapping the heat transfer between the various components of the fuel system. The heat transfer paths between the various components of the fuel system are shown in FIG. 2. The cylinder head 28 conducts heat to the injector body 26 and the injector body 26 conducts heat to the stack 32 (assuming the temperature of the engine cylinder head 28 is higher than the temperature of the stack 32). The stack 32 also receives heat as a result of electrical energy 36 transferred to the stack for control purposes. The stack 32 transfers heat by convection to or from the fuel within the stack volume 34, depending on the relative temperatures of the fuel within the stack volume 34 and the stack 32 itself.

The fuel within the stack volume 34 receives heat by convection from the injector body 26 and also receives heat as a result of the fuel (at temperature $T_{\_INJ\ IN}$) that is delivered to the stack volume 34 via the injector inlet 22. The fuel within the stack volume 34 loses heat as a result of fuel being delivered by the injector to the engine cylinder. In summary, the mean temperature of fuel in the stack volume 34 is determined by (i) heat added due to the temperature of fuel at the injector inlet 22 ($T_{\_INJ\ IN}$) (ii) the heat transferred from the injector as a result of fuel flow out of the stack volume 34 during injection, (iii) heat transfer by convection from the stack 32 to the surrounding fuel within the volume 34 and (iv) heat transfer by convention from the injector body 26.

On the basis of the model shown in FIG. 2, it can be assumed that the temperature of the piezoelectric stack, $T_{\_STACK\ STEADY\ STATE}$, varies between the temperature of the engine cylinder head, $T_{\_CYL}$, and the temperature of fuel at the injector inlet, $T_{\_INJ\ IN}$ (it can be assumed that the electrical heating effect 36 is small compared with the effect due to the temperature of the cylinder head 28). In other words, the temperature of the cylinder head $T_{\_CYL}$ dominates the stack heating effect and the fuel flow into and out of the stack volume 34 dominates the stack cooling effect. Based on this assumption, a determination of the temperature of the stack 34 can be made during engine operation.

Prior to implementation of the invention in an operational engine, a series of pre-calibration steps are carried out. Pre-calibration steps are carried out under both steady state and transient conditions, as described in further detail below.

For the calibration measurements, a temperature sensor (not shown) is fitted to the stack 32 to measure the stack temperature, $T_{\_STACK\ STEADY\ STATE}$, directly. The sensor is only fitted for calibration purposes and is removed after they are completed. The engine cylinder temperature, $T_{\_CYL}$, is measured directly by the engine cylinder temperature sensor 30 and a further sensor (not shown in FIG. 1) is fitted at the inlet of the injector to measure the temperature $T_{\_INJ\ IN}$. Therefore, for the calibration stage only, two extra sensors are fitted to the fuel system, over and above those that are used during normal engine running.

A first calibration step (Step 1), carried out under steady state conditions, will now be described.

It is necessary to calculate a pump gain factor, G, so as to enable the fuel temperature at the pump outlet 14 to be determined from the pump inlet temperature ($T_{\_PUMP\ IN}$) under steady state conditions. The temperature increase across the fuel pump 10 can be estimated from the amount of compressive work that is done on the fuel passing through the pump 10. If the fuel compression is adiabatic, the temperature increase across the pump 10 is purely a function of the pressure increase and is independent of mass flow rate through the pump 10. Hence, the temperature at the pump outlet 14 is given by the following equation:

$$T_{\_PUMP\ OUT} = T_{\_PUMP\ IN} + (P_{\_RAIL} \times G) \quad \text{(Equation 1)},$$

where $P_{\_RAIL}$ is the rail pressure (which is known from the output of the rail pressure sensor 20), and G is the pump gain factor (which is to be determined).

For steady state conditions, it can be assumed that fuel temperature at the pump outlet, $T_{\_PUMP\ OUT}$, is equal to the fuel temperature at the injector inlet, $T_{\_INJ\ IN}$. The reason for this is that convention of heat from the fuel to air is relatively small. Hence, the pump gain factor, G, can be derived from the following equation:

$$T_{\_INJ\ IN} = T_{\_PUMP\ IN} + (P_{\_RAIL} \times G) \quad \text{(Equation 2)}.$$

The fuel temperature at the injector inlet, $T_{\_INJ\ IN}$, is measured directly during calibration by means of the temperature sensor that is fitted at the injector inlet for the calibration stage only. The temperature at the pump inlet, $T_{\_PUMP\ IN}$, is also measured directly by the pump inlet sensor 16. The steady state temperature of fuel at the injector inlet, $T_{\_INJ\ IN}$, is determined by measuring the temperature as a function of time and waiting until the temperature has levelled out at its steady state value. Knowing the rail pressure, $P_{\_RAIL}$, from the output from the rail pressure sensor 20, and knowing $T_{\_INJ\ IN}$ and $T_{\_PUMP\ IN}$, enables the pump gain factor, G, to be determined.

The pump gain factor, G, is stored in a memory of the ECU and is used during a further calibration step, as discussed below, which is carried out under steady state conditions. The pump gain factor, G, is also used during normal engine running to determine the dynamic temperature of the stack.

A second calibration step (Step 2), carried out under transient conditions, will now be described.

Under transient conditions, the temperature of the fuel at the injector inlet, $T_{\_INJ\ IN}$, will lag the temperature of fuel at the pump outlet, $T_{\_PUMP\ OUT}$, due to the thermal inertia of the pipework between the high pressure pump 10 and the common rail 18, the thermal inertia between the common rail 18 and the injector inlet 22, and the thermal inertia of the common rail 18 itself. The relationship between the temperature at the pump outlet, $T_{\_PUMP\ OUT}$, and the temperature at the injector inlet, $T_{\_INJ\ IN}$, for a step change in temperature is given by the following equation:

$$T_{\_INJ\ IN} = T_{\_PUMP\ OUT}(1 - e^{-t/\tau 1})$$ (Equation 3), where $\tau 1$ is the time constant of the system that is representative of the overall thermal lag between the high pressure pump 10 and the injector inlet 22.

Under transient conditions, the time constant, $\tau 1$, is calculated during the calibration stage by measuring the temperature at the injector inlet, $T_{\_INJ\ IN}$, as a function of time and by determining the temperature at the pump outlet, $T_{\_PUMP\ OUT}$, on the basis of the Step 1 (steady state) calculation. The time constant, $\tau 1$, is stored in the memory of the ECU, together with software for executing a series of mathematical calculations to relate Equations 1, 2 and 3 together. Equations 1, 2 and 3, the time constant, $\tau 1$, and the pump gain factor, G, are then used under transient conditions, during normal engine running, to calculate the transient temperature of fuel at the injector inlet, $T_{\_INJ\ IN}$, as will be discussed further below.

In an alternative embodiment, an extra sensor may be fitted to the pump outlet 14 for the calibration stage. The pump outlet sensor enables a direct measurement of the temperature of the fuel at the pump outlet 14 and so removes the need to rely on the Step 1 calculation for determining the pump gain factor, G. The extra sensor also enables a confirmation of the assumption that the temperature of fuel at the pump outlet, $T_{\_PUMP\ OUT}$, is substantially equal to the temperature of fuel at the injector inlet, $T_{\_INJ\ IN}$, under steady state conditions.

A third calibration step (Step 3), carried out under steady state conditions, will now be described.

As described previously, it is assumed that the temperature of the piezoelectric stack, $T_{\_STACK\ STEADY\ STATE}$, varies between the temperature of the engine cylinder head, $T_{\_CYL}$, and the temperature of fuel at the injector inlet, $T_{\_INJ\ IN}$. As a third step in the calibration stage, a map is created of the ratio, R, between (i) the difference between the steady state temperature of the stack, $T_{\_STACK\ STEADY\ STATE}$, and the temperature of fuel at the injector inlet, $T_{\_INJ\ IN}$, and (ii) the difference between the temperature of the engine cylinder head, $T_{\_CYL}$, and the temperature of fuel at the injector inlet, $T_{\_INJ\ IN}$, over a range of engine speed and torque (i.e. fuel delivery) conditions.

Under steady state conditions, the ratio, R, is given by the following equation:

$$R = (T_{\_STACK\ STEADY\ STATE} - T_{\_INJ\ IN})/(T_{\_CYL} - T_{\_INJ\ IN})$$ (Equation 4).

The temperature of the stack, $T_{\_STACK\ STEADY\ STATE}$, is measured directly by the temperature sensor that is fitted to the stack, the temperature at the injector inlet is measured directly by the temperature sensor that is fitted to the injector inlet and the temperature of the cylinder head is measured directly by the temperature sensor 30 that is fitted to the cylinder head. For each speed and delivery condition, the value of the ratio, R, is then calculated and stored in the memory of the ECU.

As will be discussed in further detail below, when the engine is running a pre-stored record of the ratio is used in Equation 4, together with running temperature measurements, in order to determine the steady state temperature of the stack, $T_{\_STACK\ STEADY\ STATE}$.

A fourth calibration step (Step 4), carried out under transient conditions, will now be described.

Under transient conditions, the temperature of the stack, $T_{\_STACK\ DYNAMIC}$, will lag the steady state temperature of the stack, $T_{\_STACK\ STEADY\ STATE}$. During the calibration stage, it is also necessary to determine the time constant, $\tau 2$, which is representative of this time lag. For a step change in temperature, the temperature of the stack, $T_{\_STACK\ DYNAMIC}$, will lag the steady state temperature of the stack, $T_{\_STACK\ STEADY\ STATE}$, in accordance with the following equation:

$$T_{\_STACK\ DYNAMIC} = T_{\_STACK\ STEADY\ STATE}(1 - e^{-t/\tau 2})$$ (Equation 5).

Under transient conditions, the dynamic temperature of the stack, $T_{\_STACK\ DYNAMIC}$, is measured as a function of time. The steady state temperature of the state, $T_{\_STACK\ STEADY\ STATE}$, is determined by waiting until the temperature of the stack 32 has levelled out to its steady state value. The time constant, $\tau 2$, is then determined as the only unknown in Equation 5. The time constant, $\tau 2$, is stored in the memory of the ECU for use during normal engine running.

A first embodiment of the method that is used under normal running conditions will now be described with reference to FIGS. 1 and 2 and also FIG. 3.

When the engine is in use, the sensors that are fitted to the stack 32 and the injector inlet 22 are removed. If the pump outlet sensor is fitted to the pump outlet 14 for the purpose of calibrating the time constant, $\tau 1$, this sensor is also removed. It is a particular benefit of the invention, therefore, that it avoids the problem of connecting the sensor to the stack 32 for every engine, especially when the stack is immersed in fluid, and avoids the additional cost of providing two (or three) additional sensors on every engine.

Figure 3:
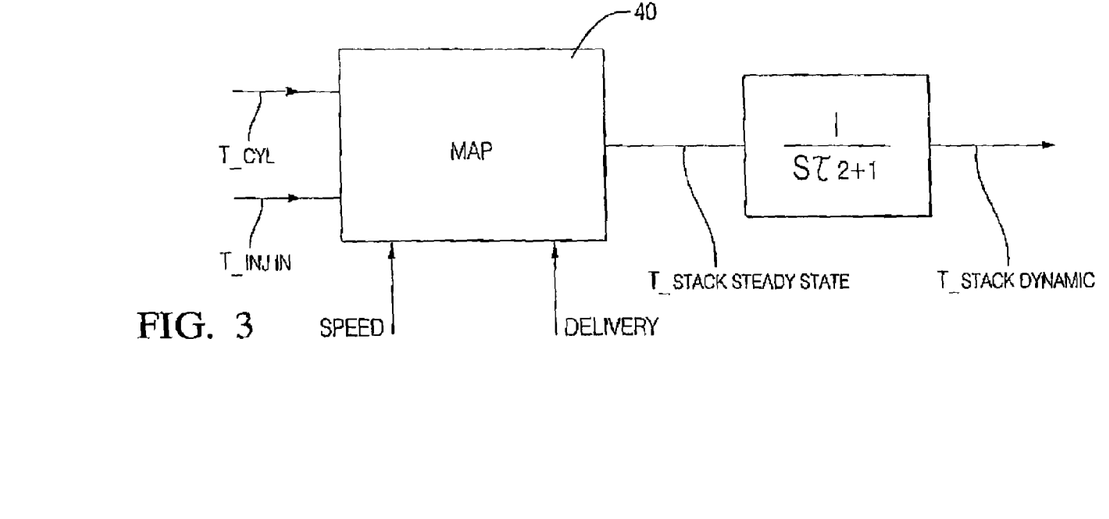
FIG. 3 is a block diagram to illustrate the method steps of a first embodiment of the invention employing a mapping function.

For any given engine speed and delivery condition, the ECU looks up the corresponding pre-stored value of the ratio, $R_{\_STORED}$, via a mapping function 40 (as shown in FIG. 3), and compares this with the real-time temperature measurements on the basis of the following:

$$R_{\_STORED} = (T_{\_STACK\ STEADY\ STATE} - T_{\_INJ\ IN})/(T_{\_CYL} - T_{\_INJ\ IN})$$ (Equation 6).

The temperature at the injector inlet, $T_{\_INJ\ IN}$, is estimated from the temperature of the fuel at the pump inlet 12 using Equations 1 and 2 and the pre-stored values for the pump gain factor, G, and the time constant, $\tau 1$. The temperature of the cylinder head, $T_{\_CYL}$, is measured directly by means of the cylinder head sensor 30. Both $T_{\_INJ\ IN}$ and $T_{\_CYL}$ provide inputs to the mapping function 40, together with the speed and delivery inputs. Hence, the steady state temperature of the stack, $T_{\_STACK\ STEADY\ STATE}$, can be deduced from Equation 6.

Each injector of the engine may be mapped separately during calibration so as to allow for characteristic differences between them. Alternatively, injectors that are positioned towards the rear of the engine may be mapped together and injectors that are positioned towards the front of the engine may be mapped together on the basis that injectors in the same position will have the same time constant, $\tau 2$.

Knowing the steady state temperature of the stack, $T_{\_STACK\ STEADY\ STATE}$, the dynamic temperature of the stack, $T_{\_STACK\ DYNAMIC}$, is then calculated on the basis of Equation 5 and the value of $\tau 2$ that is pre-stored in the ECU. The dynamic temperature of the stack, $T_{\_STACK\ DYNAMIC}$, can be used to control various aspects of injector operation. In particular, it has been recognised that as the temperature of the stack varies, the amount of charge (or voltage) transferred to and from the stack to induce a required displacement will vary. By measuring the dynamic temperature of the stack during engine operation, the control strategy for the actuator can therefore be adjusted to maintain consistency of fuelling, irrespective of any temperature sensitivity of the stack. Furthermore, the method described above is beneficial as it requires no additional sensors than those included in the system in any case for other purposes (i.e. the pump inlet sensor 16, the cylinder head temperature sensor 30 and the rail pressure sensor 20). The only additional sensors that are required are those used for calibration purposes, and these are removed before the system is actually installed in an engine or before the engine is supplied for fitment to a vehicle.

A second embodiment of the method, which is used under normal running conditions, will now be described.

Figure 4:
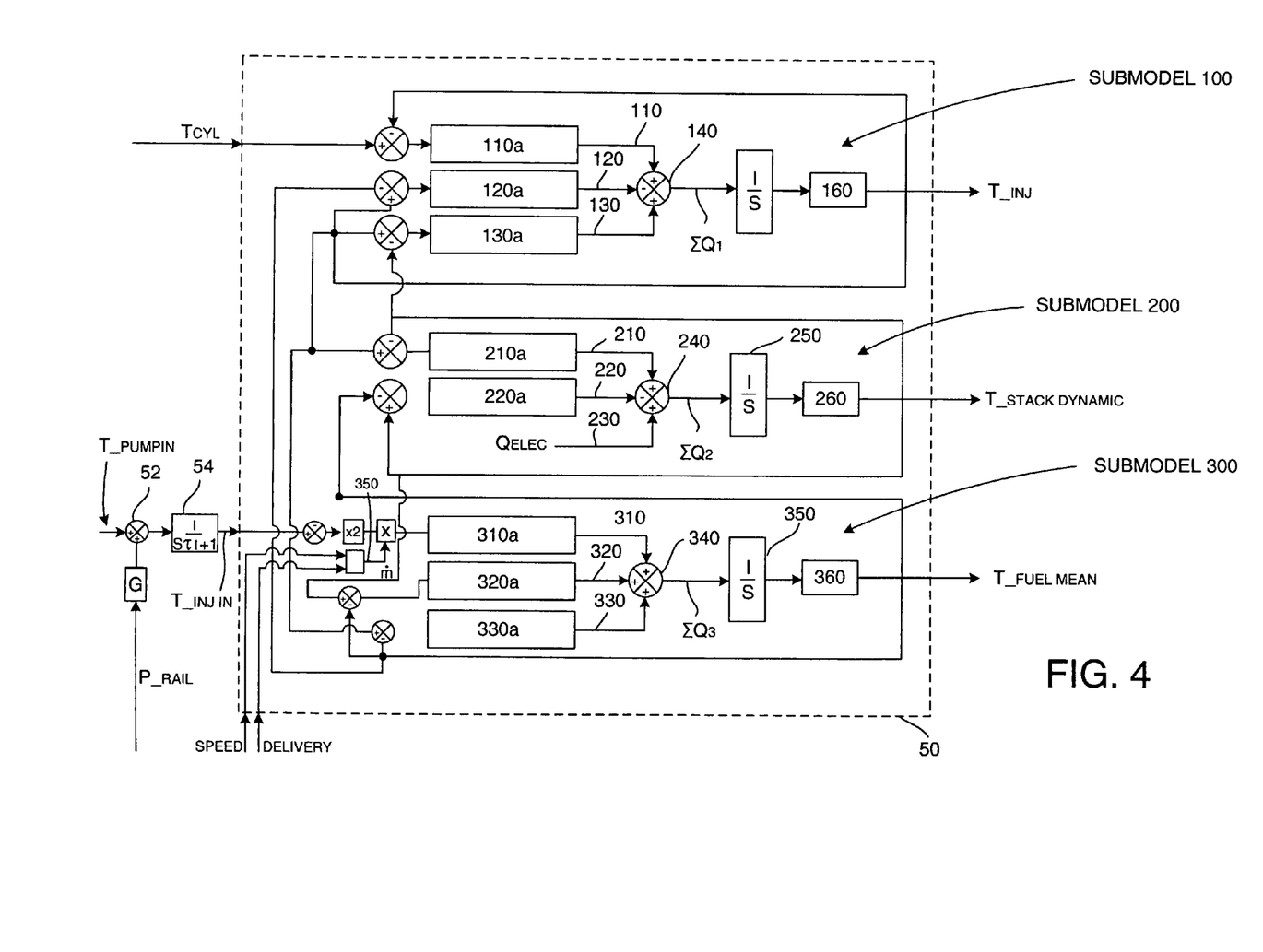
FIG. 4 is a control flow diagram to illustrate the method steps of a second embodiment of the invention employing a modelling function.

As an alternative to using a mapping method, as described previously, the system represented in FIG. 2 may be modelled to determine an estimate of the dynamic temperature of the stack $T_{\_STACK\ DYNAMIC}$. FIG. 4 is a control flow diagram to illustrate the steps of the second embodiment in further detail.

Initially, Steps 1 and 2 of the calibration stage are repeated, as described previously, to obtain values for the pump gain factor, G, and the time constant, $\tau 1$. Step 3 of the calibration stage for the mapping method is removed and, instead, is replaced by the step of modelling heat transfer between the various components of the system. Step 4 of the calibration stage is also removed.

The dashed lines 50 in FIG. 4 represent a thermal model of the injector that provides an output of the dynamic temperature of the stack $T_{\_STACK\ DYNAMIC}$ directly. The thermal model 50 therefore has the equivalent function to the mapping function of the first embodiment followed by the calculation of $T_{\_STACK\ DYNAMIC}$ based on $T_{\_STACK\ STEADY\ STATE}$ (which produces an output of the dynamic temperature of the stack, $T_{\_STACK\ DYNAMIC}$). In other words, instead of using the values of speed and delivery to look-up a pre-stored ratio for comparison with a measured ratio, the speed and delivery signals are input to the thermal model 50, together with the calculated temperature of fuel at the injector inlet, $T_{\_INJ\ IN}$, and the measured temperature of the cylinder head, $T_{\_CYL}$, in order to deduce the dynamic temperature of the stack.

The thermal model 50 consists of three sub-models; a first sub-model 100 models the heat transfer to and from the injector body 26, a second sub-model 200 models the heat transfer to and from the stack 32, and a third sub-model 300 models the heat transfer to and from the fuel in the stack volume 34. The model 50 uses pre-determined values for the coefficients of heat transfer (convention or conduction) between the various components of the system so as to determine the outputs from the three sub-models 100, 200 and 300.

In each sub-model, a thermodynamic equation is applied to the body for which the temperature is unknown i.e. the injector body 26 ($T_{\_INJ}$), the piezoelectric stack 32 ($T_{\_STACK\ STEADY\ STATE}$) and the fuel in the stack volume 34 ($T_{\_FUEL\ MEAN}$):

$$\Sigma Q = dT/dt(C_v \cdot m) \quad \text{(Equation 7)},$$

where, for each body, $\Sigma Q$ is the summed heat across the boundaries of the body, dT/dt is the rate of change of temperature of the body with time, $C_v$ is the specific heat capacity of the body and m is the mass of the body.

By applying the thermodynamic equation to the three bodies 26, 32, 34, three differential equations can be obtained which, when solved, enable a value for the unknown temperature $T_{\_STACK\ DYNAMIC}$, to be determined. As can be seen in FIG. 3, the model 50 provides three outputs: the temperature of the injector body ($T_{\_INJ}$), the dynamic temperature of the stack ($T_{\_STACK\ DYNAMIC}$) and the mean (average) temperature of fuel within the stack volume 34 ($T_{\_FUEL\ MEAN}$).

In the first sub-model 100, Equation 7 is applied to the injector body 26. The injector body temperature ($T_{\_INJ}$) is based on three elements:

(a) heat transfer (conduction) 110 from the cylinder head 28 to the injector body 26, (b) heat transfer (convention) 120 from the injector body 26 to fuel in the stack volume 34, and (c) heat transfer (conduction) 130 between the injector body 26 and the stack 32 itself.

Heat transfer (a), (b) and (c) depend, respectively, on:

(a) the temperature of the engine cylinder head ($T_{\_CYL}$), the temperature of the injector body ($T_{\_INJ}$) and the heat transfer coefficient 110a between the cylinder head 28 and the injector body 26, (b) the mean temperature of fuel within the stack volume 34 ($T_{\_FUEL\ MEAN}$), the temperature of the injector body ($T_{\_INJ}$) and the heat transfer coefficient 120a between the stack 32 and fuel in the stack volume 34, and (c) the temperature of the injector body ($T_{\_INJ}$), the temperature of the stack ($T_{\_STACK\ DYNAMIC}$) and the heat transfer coefficient 130a between the injector body 26 and the stack 32.

The three heat transfer components, (a), (b) and (c), are summed at a summing junction 140. An integrator function 150 (1/S) is applied to the summed heat transfer output, $\Sigma Q_1$. The output of the integrator function 150 is multiplied by the injector body's mass and specific heat capacity at 160 (referred to as the thermal inertia), and the temperature of the injector body, $T_{\_INJ}$, is provided as an output from the first sub-model 100 (and provides an input to the second and third sub-models 200, 300).

In the second sub-model 200, the dynamic temperature of the stack ($T_{\_STACK\ DYNAMIC}$) is determined by applying Equation 7 to the stack 32. The dynamic temperature of the stack 32 depends on three components:

(d) heat transfer (conduction) 210 between the injector body 26 and the stack 32, (e) heat transfer (convention) 220 between the stack 32 and fuel in the stack volume 34, and (f) the electrical energy ($Q_{\_ELEC}$) 230 applied to the stack 32.

Heat transfer values (d) and (e) depend, respectively, on:

(d) the temperature of the injector body ($T_{\_INJ}$, which is output from the first sub-model 100), the dynamic temperature of the stack ($T_{\_STACK\ DYNAMIC}$) and the heat transfer coefficient 210a between the injector body 26 and the stack 32, and (e) the mean temperature of the fuel in the stack volume 34 ($T_{\_MEAN}$), the dynamic temperature of the stack ($T_{\_STACK\ DYNAMIC}$) and the heat transfer coefficient 220a between the stack 32 and the fuel in the stack volume 34.

The three heat transfer components, (d), (e) and (f), are summed at the summing junction 240. An integrator function 250 (1/S) is applied to the summed heat transfer output, $\Sigma Q_2$. The output of the integrator function 250 is multiplied by the stack's mass and specific heat capacity at 260 (referred to as the thermal inertial). The temperature of the stack, $T_{\_STACK\ DYNAMIC}$, is provided as an output from the second sub-model 200 (and provides an input to the third sub-model 300).

Equation 7 is also applied in the third sub-model 300 so as to determine the average temperature of fuel surrounding the stack $T_{\_FUEL\ MEAN}$.

Initially, outside of the third sub-model 300, an input signal from the rail pressure sensor 20 (i.e. $P_{\_RAIL}$) is input to the ECU and multiplied by the pump gain factor G. The output from here is input to a pump summing junction 52, together with a signal from the pump inlet temperature sensor 16 which is representative of the temperature, $T_{\_PUMP\ IN}$, at the pump inlet 12. The output from the pump summing junction 52 is passed through a transfer function 54, providing a first order lag based on the time constant $\tau 1$, which enables an indication of the injector inlet temperature, $T_{\_INJ\_IN}$, to be determined (in the same manner as described for the previous embodiment).

The injector inlet temperature, $T_{\_INJ\_IN}$, is provided to the third sub-model 300 for the purpose of estimating the mean temperature, $T_{\_FUEL\_MEAN}$, of fuel in the stack volume 34. The third sub-model 300 also receives speed and delivery signals to determine the mass flow rate at 305. The mass flow rate 305 is then used to determine heat transfer to and from the fuel in the stack volume 34 as a result of fuel flow into and out of the volume 34 during an injection event.

In the third sub-model 300, the average temperature of the fuel in the stack volume 34 ($T_{\_FUEL\_MEAN}$) is determined by applying Equation 7. The average temperature of the fuel in the stack volume 34 depends on three components:

(h) net heat 310 transferred to fuel within the stack volume 34 as a result of fuel flowing through the stack volume 34 (between the inlet and the outlet), (i) heat transfer (convention) 320 between the stack 32 and fuel within the stack volume 34, and (j) heat transfer (convention) 330 between the injector body 26 and fuel within the stack volume 34.

Heat transfer values (h), (i) and (j) depend, respectively, on:

(h) the mass flow rate 305 through the stack volume 34 (determined by the engine speed and delivery condition), the temperature of fuel at the injector inlet ($T_{\_INJ\_IN}$) and the average temperature ($T_{\_FUEL\_MEAN}$) of fuel in the stack volume 34 and the heat capacity of fuel 310a, (i) the temperature of the stack ($T_{\_STACK\_DYNAMIC}$) and the heat transfer coefficient 320a between the stack 32 and the stack volume 34, and (j) the temperature of the injector body ($T_{\_INJ}$), the average temperature ($T_{\_FUEL\_MEAN}$) of fuel in the stack volume 34 and the heat transfer coefficient 330a between the injector body 26 and the stack volume 34.

The three heat transfer components, (h), (i) and (j), are summed at the summing junction 340. An integrator function 350 (1/S) is applied to the summed heat transfer output, $\Sigma Q_3$. The output of the integrator function 350 is multiplied by a function of the thermal inertial 360 of the fuel in the volume 34. The average temperature of the fuel volume 34, $T_{\_FUEL\_MEAN}$, is provided as an output from the third sub-model 300 (and provides an input to the first and second sub-models 100, 200).

Further particulars of sub-models 100, 200 and 300, and the way in which the thermodynamic Equation 7 is applied to the three bodies, will be self evident to the skilled reader from FIG. 3 and so will not be described in further detail.

As described previously, each injector of the engine may be modelled separately so as to allow for the characteristic differences between them (e.g. differences in the heat transfer coefficients). In other words, the model 50 may be provided for each different injector of the engine so that an estimated temperature is calculated for each individual injector. Alternatively, injectors that are positioned towards the rear of the engine may be modelled together and injectors that are positioned towards the front of the engine may be modelled together.

Once a dynamic estimate of the stack temperature is made, steps can be taken to adjust the injector control strategy to substantially remove any temperature dependency and ensure consistency of fuelling for all temperature conditions, as described previously.

Further elements of the model may be added or removed, whilst still providing an estimate of the temperature of the stack. For example, in a simplified version of the model, the temperature of the injector body 26 (the first sub-model 100) need not be modelled but, instead, may be assumed to be equal to the temperature of the cylinder head, $T_{\_CYL}$.

Figure 5:
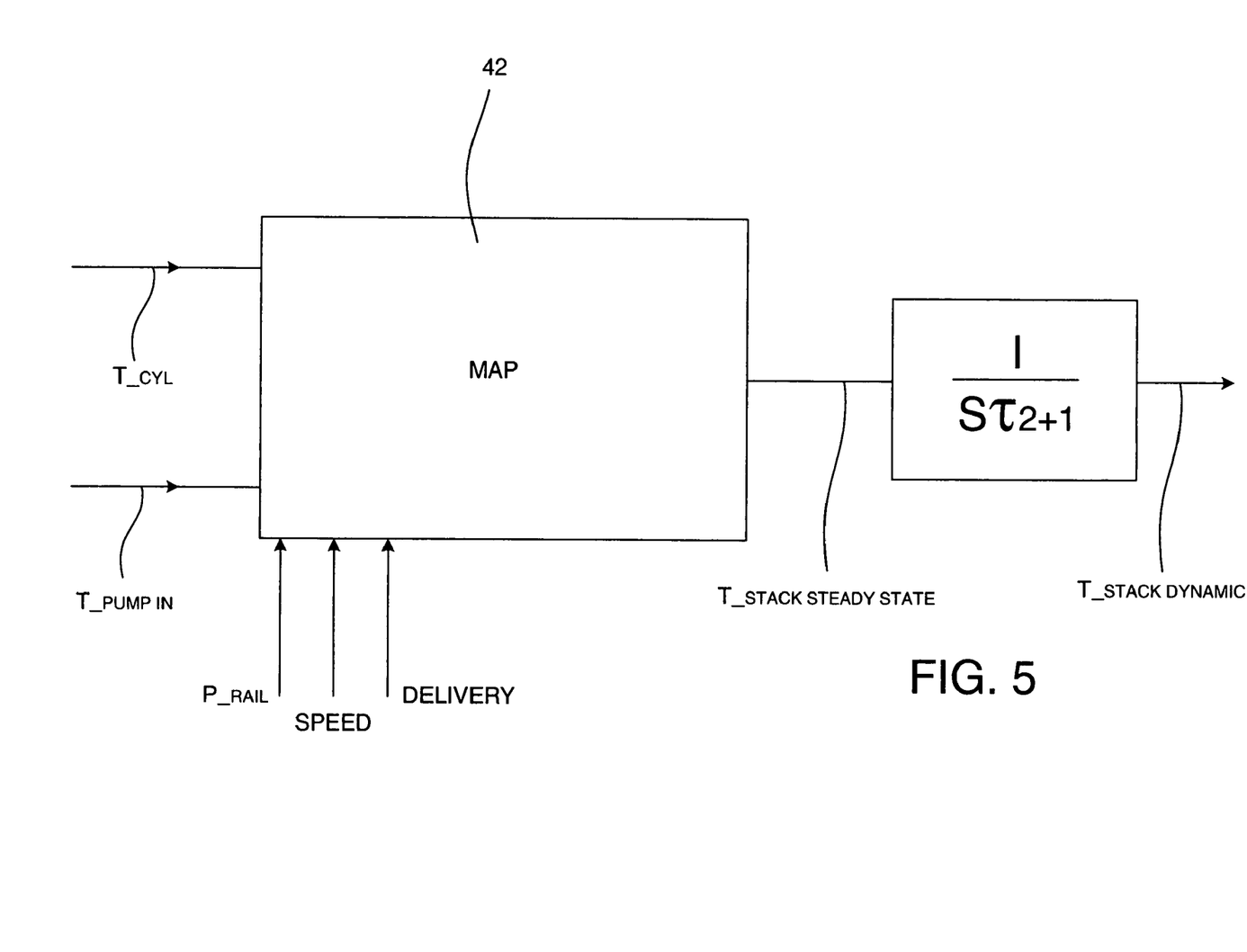
FIG. 5 is a block diagram to illustrate the method steps of a third embodiment of the invention employing an alternative mapping function to that shown in FIG. 3.

Referring to FIG. 5, in a further alternative embodiment an extended mapping function 42 is provided to map the system on the basis of the rail pressure signal, $P_{\_RAIL}$, and the pump inlet temperature, $T_{\_PUMP\_IN}$, together with the cylinder head temperature, $T_{\_CYL}$, and the speed and delivery inputs as before. Each input variable has a predetermined operation range. Combinations of the six inputs can be selected, over their operation range, and the stack steady state temperature measured. In this way a six dimensional map can be produced so that during operation any combination of the six inputs can be fed into the map, providing an estimate of the steady state stack temperature.

The combination can be selected as a full factorial of the six inputs, but to reduce the number of calibration points an orthogonal array could be used, for example an L18 orthogonal array ($2^1 \times 3^7$), which allows mapping of up to seven variables each at a high, medium and low value state and one variable each at a high and low value state. However, in this particular application, only five variables are required as inputs, each at high, medium and low value states. A possible disadvantage of implementing the mapping function 42 in FIG. 5 is that a high amount of upfront calibration is required. The mapping function 40 in FIG. 3 is less complex in terms of the calibration required.

The mapping function 42 in FIG. 5 does, however, remove the need to pre-calibrate the system for the pump gain factor, G, and the time constant, $\tau 1$, as described previously. In order to determine the dynamic temperature of the stack, $T_{\_STACK\_DYNAMIC}$, from the output from the extended mapping function it is necessary to apply an integrator function (first order lag based on the time constant $\tau 2$) to the steady state temperature estimate, as described previously for FIG. 3.

In other embodiments of the invention, whether mapping or modelling is implemented, the cylinder head temperature sensor may be removed and instead the temperature of the cylinder head may be determined by measuring the temperature of engine coolant, which flows past the system for cooling purposes. This is particularly desirable when the method is implemented in an engine that is not already provided with a cylinder head temperature sensor for other purposes.

It will be appreciated that alternative mathematical relationships may be found to be more accurate or suitable for different system set-ups, and that the equations described previously are not intended to be in any way limiting to the scope of the invention as set out in the claims.

It will also be appreciated that the method steps recited in the accompanying claims need not, in all cases, be performed in the order in which they are introduced, but may be reversed or re-ordered whilst still providing the desired outcome of estimating the temperature of the piezoelectric body.

The invention claimed is:

1. A method of estimating the temperature of a piezoelectric actuator body for controlling the operation of a fuel injector mounted within an engine housing and supplied with fuel from a high pressure fuel pump, the piezoelectric actuator body being located within a fuel volume which receives fuel from the high pressure fuel pump, in use, the method comprising:

determining a first temperature of fuel upstream of the fuel volume;

determining a temperature of the engine housing;

estimating a temperature of the piezoelectric actuator body based on the first temperature and the temperature of the engine housing;

determining a pump outlet temperature of fuel at an outlet of the high pressure fuel pump; and determining the injector inlet temperature based on the pump outlet temperature; and determining the injector inlet temperature based on the pump outlet temperature and a predetermined time constant representative of at least one system characteristic between the pump outlet and the injector inlet.

2. The method as claimed in claim 1, wherein the step of determining the first temperature includes determining a temperature of fuel at an inlet of the fuel injector.

3. The method as claimed in claim 2, wherein determining the pump outlet temperature includes:

measuring a pump inlet temperature at an inlet to the high pressure fuel pump, measuring the pressure of fuel at the high pressure fuel pump outlet, and calculating the pump outlet temperature based on the pump inlet temperature, the measured fuel pressure and a pump gain factor.

4. The method as claimed in claim 2, wherein the injector inlet temperature is determined as being equal to the pump outlet temperature.

5. The method as claimed in claim 1, wherein the step of determining the first temperature includes determining a pump inlet temperature at an inlet to the high pressure fuel pump.

6. The method as claimed in claim 1, wherein determining the temperature of the engine housing includes measuring the temperature of the engine housing using a temperature sensor.

7. The method as claimed in claim 1, including providing an engine coolant for cooling the engine housing, wherein determining the temperature of the engine housing includes estimating the temperature of temperature of the engine housing based on the temperature of the engine coolant.

8. A computer-implemented system for estimating the temperature of a piezoelectric actuator body for controlling the operation of a fuel injector mounted within an engine housing and supplied with fuel from a high pressure fuel pump, the piezoelectric actuator body being located within a fuel volume which receives fuel from the high pressure fuel pump, in use, the system comprising:

a processor for processing digital data; a memory coupled to said processor for storing digital data; and means, coupled to said memory, for inputting digital data; said processor configured for executing at least one computer program software portion that is operable to implement one or more of the steps of claim 1.

9. A method of estimating the temperature of a piezoelectric actuator body for controlling the operation of a fuel injector mounted within an engine housing and supplied with fuel from a high pressure fuel pump, the piezoelectric actuator body being located within a fuel volume that receives fuel from the high pressure fuel pump, in use, the method comprising:

determining a first temperature of fuel upstream of the fuel volume;

determining a temperature of the engine housing;

estimating a temperature of the piezoelectric actuator body based on the first temperature and the temperature of the engine housing;

determining a pump outlet temperature of fuel at an outlet of the high pressure fuel pump;

determining the injector inlet temperature based on the pump outlet temperature; and determining the injector inlet temperature based on the pump outlet temperature and a predetermined time constant representative of at least one system characteristic between the pump outlet and the injector inlet;

wherein the step of determining the first temperature includes determining a temperature of fuel at an inlet of the fuel injector.

10. The method as claimed in claim 9, wherein the system characteristic includes a time lag between the pump outlet temperature and the injector inlet temperature.

11. A method of estimating the temperature of a piezoelectric actuator body for controlling the operation of a fuel injector mounted within an engine housing and supplied with fuel from a high pressure fuel pump, the piezoelectric actuator body being located within a fuel volume which receives fuel from the high pressure fuel pump, in use, the method comprising:

determining a first temperature of fuel upstream of the fuel volume;

determining a temperature of the engine housing;

estimating a temperature of the piezoelectric actuator body based on the first temperature and the temperature of the engine housing; and estimating a steady state temperature of the piezoelectric actuator body by means of a mapping function which receives inputs of the injector inlet temperature, the temperature of the engine housing, an engine speed condition and a fuel delivery condition;

wherein the step of determining the first temperature includes determining a temperature ($T_{13\ INJ\ IN}$) of fuel at an inlet of the fuel injector.

12. The method as claimed in claim 11, including controlling the fuel injector in dependence upon the estimated steady state temperature of the piezoelectric actuator body.

13. The method as claimed in claim 11, wherein the mapping function compares a value based on the engine housing temperature and the injector inlet temperature with a predetermined calibration value, the method further comprising estimating the steady state temperature of the piezoelectric actuator body on the basis of the comparison.

14. The method as claimed in claim 13, wherein the value is the ratio of (i) the difference between the estimated steady state temperature of the piezoelectric actuator body and the injector inlet temperature and (ii) the difference between the engine housing temperature and the injector inlet temperature.

15. The method as claimed in claim 13, including determining the predetermined calibration value.

16. The method as claimed in claim 15, wherein determining the predetermined calibration value includes:

measuring the injector inlet temperature using an injector inlet temperature sensor;

determining the temperature of the engine housing;

measuring the steady state temperature of the piezoelectric actuator body using a piezoelectric temperature sensor; and calculating the predetermined calibration value as a ratio of (i) the difference between the measured steady state temperature of the piezoelectric actuator body and the injector inlet temperature and (ii) the difference between the measured engine housing temperature and the injector inlet temperature.

17. The method as claimed in claim 11, further comprising estimating a dynamic temperature of the piezoelectric body based on the estimated steady state temperature.

18. The method as claimed in claim 17, further comprising controlling the fuel injector in dependence upon the estimated dynamic temperature of the piezoelectric actuator body.

19. The method as claimed in claim 18, wherein controlling the fuel injector includes controlling voltage and/or charge transfer to and from the piezoelectric actuator body.

20. A method of estimating the temperature of a piezoelectric actuator body for controlling the operation of a fuel injector mounted within an engine housing and supplied with fuel from a high pressure fuel pump, the piezoelectric actuator body being located within a fuel volume which receives fuel from the high pressure fuel pump, in use, the method comprising:
   determining a first temperature of fuel upstream of the fuel volume;
   determining a temperature of the engine housing;
   estimating a temperature of the piezoelectric actuator body based on the first temperature and the temperature of the engine housing; and
   determining a pressure of fuel at an outlet of the high pressure fuel pump and estimating a steady state temperature of the piezoelectric actuator body by means of a mapping function which receives inputs of the pump inlet temperature, the temperature of the engine housing, the pressure of fuel at the high pressure fuel pump outlet, an engine speed condition and a fuel delivery condition:
   wherein the step of determining the first temperature includes determining a pump inlet temperature at an inlet to the high pressure fuel pump.

21. The method as claimed in claim 20, further comprising estimating a dynamic temperature of the piezoelectric body based on the estimated steady state temperature.

22. The method as claimed in claim 20, including controlling the fuel injector in dependence upon the estimated steady state temperature of the piezoelectric actuator body.

23. The method as claimed in claim 21, including controlling the fuel injector in dependence upon the estimated dynamic temperature of the piezoelectric actuator body.

24. The method as claimed in claim 23, wherein controlling the fuel injector includes controlling voltage and/or charge transfer to and from the piezoelectric actuator body.

25. A method of estimating the temperature of a piezoelectric actuator body for controlling the operation of a fuel injector mounted within an engine housing and supplied with fuel from a high pressure fuel pump, the piezoelectric actuator body being located within a fuel volume which receives fuel from the high pressure fuel pump, in use, the method comprising:
   determining a first temperature of fuel upstream of the fuel volume;
   determining a temperature of the engine housing;
   estimating a temperature of the piezoelectric actuator body based on the first temperature and the temperature of the engine housing; and
   estimating a dynamic temperature of the piezoelectric actuator body by means of a thermal model of heat transfer between the piezoelectric actuator body, the injector body and the fuel volume, wherein the thermal model receives inputs based on injector inlet temperature and the temperature of the engine housing;
   wherein the step of determining the first temperature includes determining a temperature of fuel at an inlet of the fuel injector.

26. The method as claimed in claim 25, wherein the thermal model further receives inputs based on an engine speed condition and a fuel delivery condition.

27. The method as claimed in claim 25, wherein the thermal model includes a sub-model of heat transfer to and from the piezoelectric body.

28. The method as claimed in claim 25, wherein the thermal model includes a sub-model of heat transfer to and from the fuel within the fuel volume.

29. The method as claimed in claim 25, wherein the thermal model includes a sub-model of heat transfer to and from the fuel injector.

30. The method as claimed in claim 25, further comprising controlling the fuel injector in dependence upon the estimated dynamic temperature of the piezoelectric actuator body.

31. A method of estimating the temperature of a piezoelectric actuator body for controlling the operation of a fuel injector mounted within an engine housing and supplied with fuel from a high pressure fuel pump, the piezoelectric actuator body being located within a fuel volume which receives fuel from the high pressure fuel pump, in use, the method comprising:
   determining a first temperature of fuel at an inlet of the fuel injector,
   determining a temperature of the engine housing,
   estimating a temperature of the piezoelectric actuator body based on the first temperature and the temperature of the engine housing,
   determining the injector inlet temperature based on the pump outlet temperature and a predetermined time constant representative of at least one system characteristic between the pump outlet and the injector inlet, and
   controlling the piezoelectric actuator body on the basis of the estimated temperature.

32. A method of estimating the temperature of a piezoelectric actuator body for controlling the operation of a fuel injector mounted within an engine housing and supplied with fuel from a high pressure fuel pump, the piezoelectric actuator body being located within a fuel volume which receives fuel from the high pressure fuel pump, in use, the method comprising:
   determining a pump inlet temperature at an inlet to the high pressure fuel pump,
   determining a temperature of the engine housing,
   estimating a temperature of the piezoelectric actuator body based on the pump inlet temperature and the temperature of the engine housing,
   determining the injector inlet temperature based on the pump outlet temperature and a predetermined time constant representative of at least one system characteristic between the pump outlet and the injector inlet, and
   controlling the piezoelectric actuator body on the basis of the estimated temperature.

* * * * *